United States Patent
Tojo et al.

(10) Patent No.: US 9,691,155 B2
(45) Date of Patent: Jun. 27, 2017

(54) IMAGE PROCESSING APPARATUS AND IMAGE PROCESSING METHOD FOR FINDING BACKGROUND REGIONS IN AN IMAGE

(71) Applicant: CANON KABUSHIKI KAISHA, Tokyo (JP)

(72) Inventors: Hiroshi Tojo, Fuchu (JP); Kotaro Yano, Tokyo (JP); Tuan quang Pham, North Ryde (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/674,722

(22) Filed: Mar. 31, 2015

(65) Prior Publication Data

US 2015/0279049 A1 Oct. 1, 2015

(30) Foreign Application Priority Data

Apr. 1, 2014 (JP) .................................. 2014-075716

(51) Int. Cl.
*G06K 9/34* (2006.01)
*G06T 7/00* (2017.01)
*G06K 9/46* (2006.01)
*G06T 7/11* (2017.01)
*G06T 7/254* (2017.01)
*G06T 7/194* (2017.01)

(52) U.S. Cl.
CPC .......... *G06T 7/0081* (2013.01); *G06K 9/4609* (2013.01); *G06K 9/4642* (2013.01); *G06K 9/4652* (2013.01); *G06T 7/11* (2017.01); *G06T 7/194* (2017.01); *G06T 7/254* (2017.01); *G06T 2207/10016* (2013.01); *G06T 2207/20021* (2013.01); *G06T 2207/30232* (2013.01)

(58) Field of Classification Search
None
See application file for complete search history.

(56) References Cited

U.S. PATENT DOCUMENTS

2012/0251003 A1* 10/2012 Perbet et al. ................. 382/173

FOREIGN PATENT DOCUMENTS

| JP | 10-187996 A | 7/1998 |
|---|---|---|
| JP | 2008-165792 A | 7/2008 |

OTHER PUBLICATIONS

Fang, Xu, et al. "Object Detection in Dynamic Scenes Based on Codebook with Superpixels." Pattern Recognition (ACPR), 2013 2nd IAPR Asian Conference on. IEEE, 2013.*

(Continued)

*Primary Examiner* — Andrew Moyer
(74) *Attorney, Agent, or Firm* — Carter, DeLuca, Farrell & Schmidt, LLP (57) ABSTRACT

An image processing apparatus comprises a video input unit, a region division unit configured to divide an image acquired by the video input unit into a plurality of regions each including pixels of similar attributes, a feature extraction unit configured to extract a feature from each divided region, a background model storage unit configured to store a background model generated from a feature of a background in advance, and a feature comparison unit configured to compare the extracted feature with a feature in the background model and determine for each of the regions whether the region is the background.

15 Claims, 4 Drawing Sheets

(56) References Cited

OTHER PUBLICATIONS

Kim, Kyungnam et al., "Real-time foreground-background segmentation using codebook model", Real-Time Imaging 11 (2005) 172-185.
Schick, Alexander et al., "Measuring and Evaluating the Compactness of Superpixels", 21st International Conference on Pattern Recognition (ICPR 2012), Nov. 11-15, 2012, Tsukuba, Japan.
Oral, Mustafa et al., "Centre of mass model—A novel approach to background modelling for segmentation of moving objects", Image and Vision Computing 25 (2007) 1365-1376.
Devi, K. Suganya et al., "Improving the Efficiency of Background Subtraction using Super pixel Extraction and Midpoint for Centroid", International Journal of Computer Applications (0975-8887); vol. 43, No. 10, Apr. 2012; pp. 1-5.
Fang, Xu et al., "Object Detection in Dynamic Scenes Based on Codebook with Superpixels", 2013 Second IAPR Asian Conference on Pattern Recognition.
European Search report issued in corresponding application No. 15000909.0 on Aug. 12, 2015.
Achanta et al., "SLIC Superpixels", EPFL Technical Report 149300, Jun. 2010, pp. 1-16.
Felzenszwalb et al., "Efficient graph-based image segmentation", International Journal of Computer Vision, 2004, pp. 1-26.
Shimada, Atsushi, et al., "Increment and Decrement of Gaussians in Adaptive Mixture-of-Gaussian Background Models." Proc. MIRU (2006): 746-751.
Korean office action issued in corresponding application No. 10-2015-0045880 on Jan. 13, 2017.

\* cited by examiner

IMAGE PROCESSING APPARATUS AND IMAGE PROCESSING METHOD FOR FINDING BACKGROUND REGIONS IN AN IMAGE

BACKGROUND OF THE INVENTION

Field of the Invention

The present invention relates to a technique of detecting an object from a moving image.

Description of the Related Art

As a technique of detecting an object from an image shot by a camera, a background subtraction method is disclosed. In the background subtraction method, a background image without any object is shot by a fixed camera in advance, and the feature of the image is stored as a background model. After that, the difference between the feature in the background model and the feature in an image input from the camera is obtained, and a different region is detected as a foreground (object).

For example, in patent literature 1 (Japanese Patent No. 2950267), a background model is generated using pixel values as features, and the difference is calculated on a pixel basis, thereby detecting an object. When the background model is generated on a pixel basis, the memory consumption and the processing cost increase as the resolution rises. To prevent this, in patent literature 2 (Japanese Patent No. 4653155), an input image is divided into 8×8 pixel blocks, and DCT (Discrete Cosine Transform) coefficients as a result of encoding by DCT are used as features.

In the background subtraction method, however, since the camera is assumed to be fixed, the following problems arise if the camera moves due to vibration or the like. That is, if an input image is shifted by the motion of the camera even without any object in the image, image contents at the same coordinates change between input images that temporally continue in the method of patent literature 1. For example, in pixels near the boundary between a red door and a blue wall, the pixel values abruptly change from red to blue. Additionally, in a block including the boundary between the red door and the blue wall, the ratio of red and blue pixels included in the block changes in the method of patent literature 2. As a result, a detection error occurs near a boundary including strong edges in the background in both the method of patent literature 1 and the method of patent literature 2.

In the method of patent literature 1, since the coordinates of pixels of the same pixel value only shift, the detection error can be prevented by adding neighboring pixels to the comparison target. However, this method cannot solve the problems of the memory capacity and the processing cost. The method of patent literature 2 can suppress the memory capacity and the processing cost. However, since the feature of the block itself changes, the problem of the detection error cannot be solved. Hence, the conventional techniques cannot avoid a detection error that occurs due to the shift of an input image caused by the motion of the camera without increasing the memory consumption and the processing cost.

SUMMARY OF THE INVENTION

The present invention has been made in consideration of the above-described problems, and provides a technique for implementing avoidance of a detection error that occurs due to the shift of an input image caused by a motion of an image capturing device without increasing the memory consumption and the processing cost.

According to the first aspect of the present invention, there is provided an image processing apparatus comprising: a video input unit; a region division unit configured to divide an image acquired by the video input unit into a plurality of regions each including pixels of similar attributes; a feature extraction unit configured to extract a feature from each region divided by the region division unit; a background model storage unit configured to store a background model generated from a feature of a background in advance; and a feature comparison unit configured to compare the feature extracted by the feature extraction unit with a feature in the background model and determine for each of the plurality of regions whether the region is the background.

According to the second aspect of the present invention, there is provided an image processing method performed by an image processing apparatus, comprising: a region division step of dividing an acquired image into a plurality of regions each including pixels of similar attributes; a feature extraction step of extracting a feature from each region divided in the region division step; and a feature comparison step of comparing the feature extracted in the feature extraction step with a feature in a background model generated from a feature of a background and determining for each of the plurality of regions whether the region is the background.

Further features of the present invention will become apparent from the following description of exemplary embodiments (with reference to the attached drawings).

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

Figure 2:
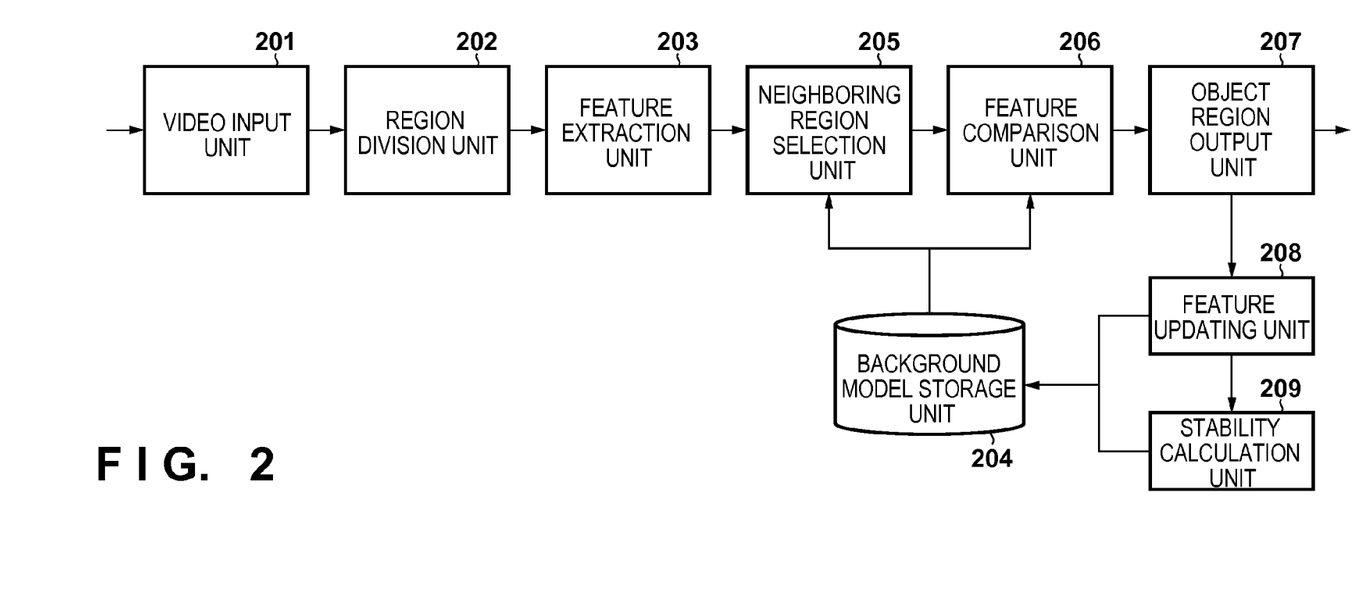
FIG. 2 is a block diagram showing an example of the functional arrangement of an image processing apparatus.

In this embodiment, a mode of an image processing apparatus that sequentially acquires the images of frames of a moving image and detects a region including an object from the acquired images will be described. First, an example of the functional arrangement of the image processing apparatus according to this embodiment will be explained with reference to the block diagram of FIG. 2. Note that the arrangement shown in FIG. 2 is merely an example, and any other arrangement that implements functions equal to or more than those in FIG. 2 may be employed.

A video input unit 201 sequentially acquires the images of frames (frame images) of a moving image, and sends the acquired frame images to a region division unit 202 of the subsequent stage. The images of frames may sequentially be sent from a video camera or transferred from an external apparatus by a technique such as streaming.

The region division unit 202 divides each frame image received from the video input unit 201 into regions of similar image features (attributes). A feature extraction unit 203 performs processing of extracting an image feature from each region divided by the region division unit 202. A neighboring region selection unit 205 reads out information of a region in the neighborhood of each region divided by the region division unit 202 from the information of regions stored in a background model storage unit 204, and sends the readout information to a feature comparison unit 206.

For each region divided by the region division unit 202, the feature comparison unit 206 compares the image feature extracted from the region with the information that the neighboring region selection unit 205 has read out from the background model storage unit 204 concerning the region.

In accordance with the comparison result of the feature comparison unit 206, an object region output unit 207 specifies a region including an object out of the regions divided for the frame image, and outputs information about the specified region.

A feature updating unit 208 and a stability calculation unit 209 update the background model stored in the background model storage unit 204.

Figure 3:
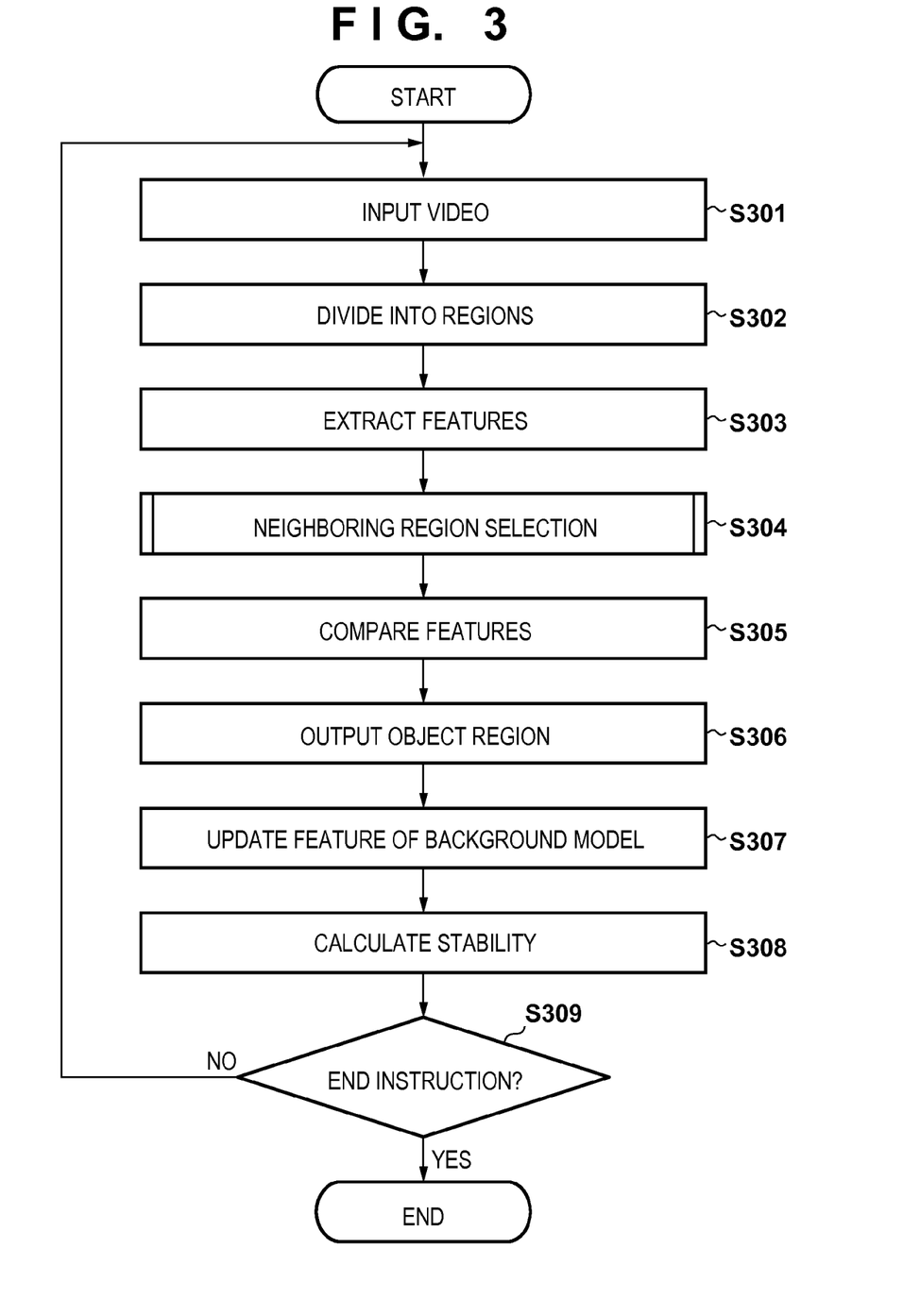
FIG. 3 is a flowchart of processing performed by the image processing apparatus.

Processing performed by the image processing apparatus according to this embodiment to extract a region including an object from a frame image will be described next with reference to FIG. 3 that shows the flowchart of the processing.

In step S301, the video input unit 201 acquires a frame image corresponding to one frame, and sends the acquired frame image to the region division unit 202 of the subsequent stage.

In step S302, the region division unit 202 divides the frame image received from the video input unit 201 into regions of similar image features. There have recently been proposed methods of dividing an image into subregions (called Superpixels) each formed from a group of pixels having similar image features such as luminances or colors (for example, see non-patent literature 1 (Radhakrishna Achanta, Appu Shaji, Kevin Smith, Aurelien Lucchi, Pascal Fua, and Sabine Susstrunk, "SLIC Superpixels", EPFL Technical Report 149300, June 2010) and non-patent literature 2 (Felzenszwalb, P., Huttenlocher, D., "Efficient graph-based image segmentation", International Journal of Computer Vision, 2004)).

Although the sizes of Superpixels are almost constant (non-patent literature 1) or largely change depending on the contents of the image (non-patent literature 2), the image division methods have the following common characteristic. That is, in Superpixel division, since pixels having similar luminances or colors are put together, the image is divided at strong edge portions where the luminance or color largely changes. A strong edge is observed at the boundary of an object included in the image. Hence, the boundary of a Superpixel near the boundary of an object matches the boundary of the object. In this embodiment, such a characteristic of a Superpixel is used.

After dividing the frame image into regions (that is, Superpixels) of similar image features, the region division unit 202 assigns, to each pixel of the frame image, a label number unique to a Superpixel to which the pixel belongs, and registers the barycentric position of the region in the frame image in a memory managed by the image processing apparatus.

In step S303, the feature extraction unit 203 extracts an image feature from each Superpixel divided by the region division unit 202. When extracted on a Superpixel basis, the image features do not change even when a shift occurs in the frame image along with the motion of the image capturing device for capturing the moving image. In the above-described example of the boundary between the red door and the blue wall, even when a shift occurs in the frame image, the boundary of a Superpixel always exists at the boundary between the red door and the blue wall. For this reason, no image feature is extracted from a Superpixel where red and blue mix. It is therefore possible to extract constant features between frame images even near an object boundary.

In this embodiment, as an image feature to be extracted from a Superpixel, a color feature that is the average pixel value of color components (for example, the average pixel value for each of R, G, and B components) of each pixel in the Superpixel is used. The RGB color space or the like may be divided on a color component basis, and the histogram of color values of each pixel in the Superpixel may be generated. The color space is not particularly limited to the RGB color space, and a YCbCr or CIE LAB color space may be used. Some other values are also applicable as color features, as a matter of course.

In this embodiment, as an image feature to be extracted from a Superpixel, a shape feature that is information defining the shape of the Superpixel is also used. The "information defining the shape of a Superpixel" can be, for example, the pixel position of a pixel on the boundary of the Superpixel, the pixel position of each pixel in the Superpixel, or the number of pixels in the Superpixel (the area of the Superpixel).

Alternatively, the ratio of the number of pixels on a region boundary having a predetermined edge intensity or more to the peripheral length may be used as an image feature. As will be described later, a Superpixel surrounded by a strong edge is considered to be stable, and therefore, the edge can be regarded as characterizing the shape of the Superpixel. The secondary moment of an x-coordinate and the secondary moment of a y-coordinate when the pixel position of each pixel is expressed as (x, y), xy moment, or a Fourier descriptor of a boundary line may be used.

Using the label number assigned to each pixel of the frame image, the feature extraction unit 203 specifies a region of a pixel group with the same label number assigned, that is, a Superpixel, and extracts image features (color feature and shape feature) from the specified Superpixel. For each Superpixel of the frame image, the feature extraction unit 203 registers n (n is an integer, n≥2) image features extracted from the Superpixel in the above-described memory as an n-dimensional feature vector (in the above example, a four-dimensional vector formed from the average pixel values of color components of each pixel in the Superpixel and information (area in this case) defining the shape of the Superpixel).

Before an explanation of the process of step S304, information held by the background model storage unit 204 will be described. In the background model storage unit 204, time statistics (including stability) of image features of each Superpixel are registered as a background model together with the label number and the barycentric position of the Superpixel.

"Stability" is an amount representing the degree of stability of a Superpixel in terms of time. In a moving image, illumination, white balance, noise, and the like change. Hence, even pixels located at the same position between frame images have different luminances and colors. When each frame image of the moving image is divided into Superpixels, each Superpixel is as follows. As described above, since an object boundary with a strong edge matches the boundary of a Superpixel, the shape feature of the Superpixel hardly changes between the frame images even when the color feature changes. However, in a region without a strong edge where the luminance or color moderately changes (for example, unevenly illuminated carpet floor), the shape feature of the Superpixel readily changes between the frame images. This is because even a slight variation in the luminance or color of each pixel affects the Superpixel division result. As a consequence, the ratio of colors included in the Superpixel also changes. That is, when the Superpixel becomes unstable, a difference is readily generated between image features, and a detection error may occur due to a variation in illumination. Hence, the stability is represented by the degree of variation when the image feature of a Superpixel is temporally observed. In this embodiment, as a method of obtaining stability, a method of approximating, by a Gaussian model, the probability distribution of each element of an image feature in a Superpixel corresponding to a specific region will be described. Note that one Superpixel (Superpixel X) will be focused here for the descriptive convenience, and all Superpixels are handled in the same way. Letting $F_t$ (n dimensions) be the feature vector of the Superpixel X of a tth frame, a probability density function $\eta$ is given by $$\eta(F_t, \mu_t, \Sigma_t) \frac{1}{(2\pi)^{\frac{n}{2}}|\Sigma_t|^{\frac{1}{2}}} e^{-\frac{1}{2}(F_t-\mu_t)^T \Sigma_t^{-1}(F_t-\mu_t)} \quad (1)$$

Note that n is the number of dimensions of the feature vector, $\mu_t$ is the average vector (n dimensions) of feature vectors of the Superpixels X in frames up to the tth frame, and $\Sigma_t$ is the covariance matrix (n×n dimensions) of the average vectors. The subscript t represents the tth frame. As will be described later, $\mu_t$ and $\Sigma_t$ are updated on a frame basis. Note that in this embodiment, the feature vector $F_t$ is formed from four-dimensional elements, that is, the average values of RGB components in the Superpixel which are the color features and the area that is the shape feature. To facilitate the operation, assume that the dimensions of the feature vector $F_t$ are independent of each other, the color features take the same value $\sigma_{c,t}$ as the standard deviation in all the components, and the standard deviation of the shape feature is $\sigma_{s,t}$.

$$\Sigma_t = \begin{pmatrix} \sigma_{c,t}^2 & 0 & 0 & 0 \\ 0 & \sigma_{c,t}^2 & 0 & 0 \\ 0 & 0 & \sigma_{c,t}^2 & 0 \\ 0 & 0 & 0 & \sigma_{s,t}^2 \end{pmatrix} \quad (2)$$

The smaller $\sigma_{c,t}$ and $\sigma_{s,t}$ are, the more stable the Superpixel is. Hence, these values are used as stability. In this embodiment, the background model of each Superpixel is assumed to include the average vector $\mu_t$ of the Superpixel, the standard deviations $\sigma_{c,t}$ and $\sigma_{s,t}$ (stability) of the image features in the Superpixel, and the label number and the barycentric coordinates of the Superpixel.

Figure 4:
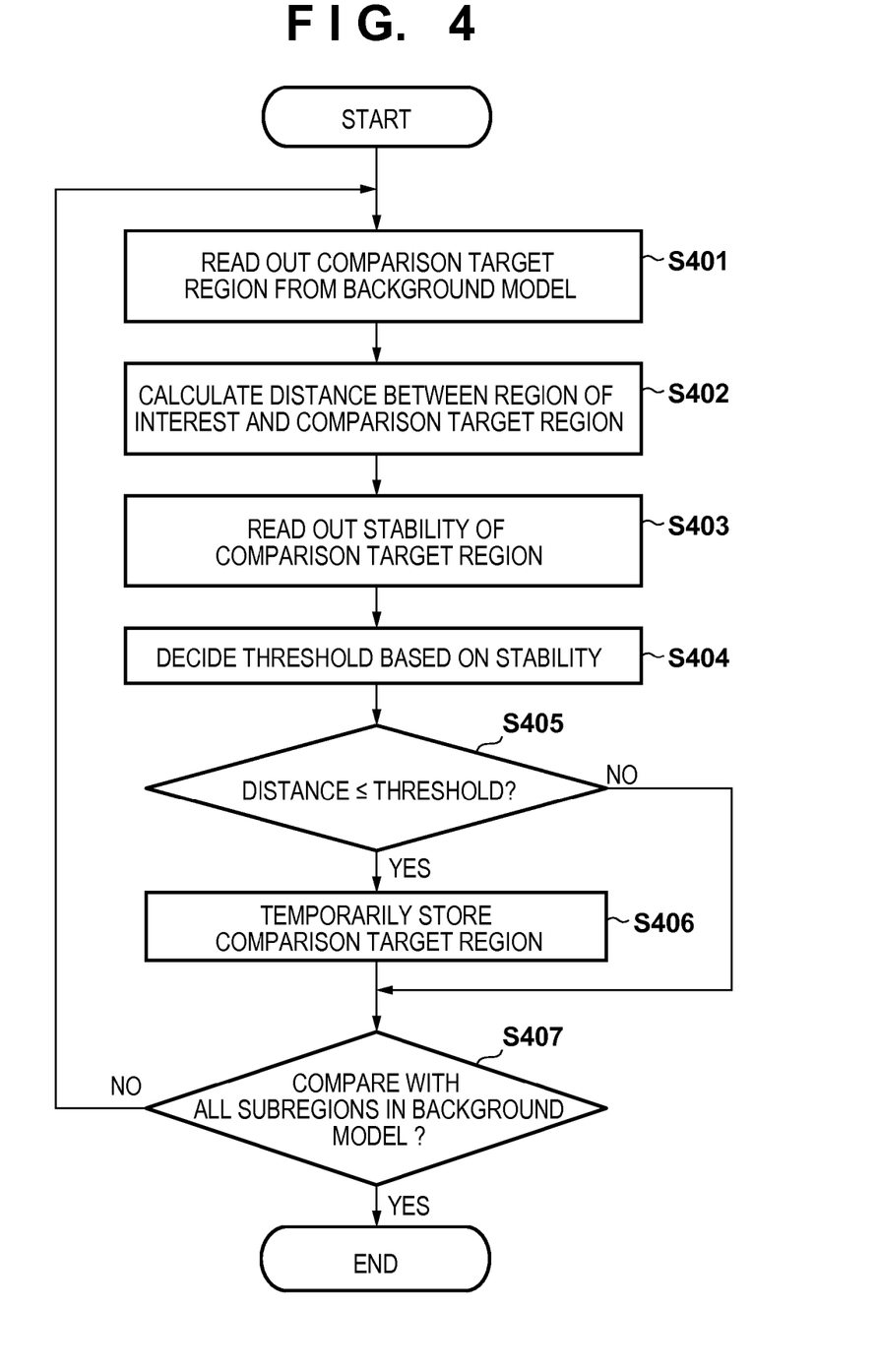
FIG. 4 is a flowchart showing details of the process of selecting a neighboring region.

The process (step S304) of selecting a neighboring region performed by the neighboring region selection unit 205 based on the above assumption will be described with reference to the flowchart of FIG. 4. Note that the flowchart of FIG. 4 shows processing for one Superpixel (Superpixel of interest) in a frame image. Actually, the processing according to the flowchart of FIG. 4 is executed for each Superpixel in the frame image.

In step S401, the barycentric position of a Superpixel yet to be read out from the background model storage unit 204 is read out. As described above, the barycentric position of each Superpixel is registered in the background model storage unit 204. Hence, in this step, a barycentric position yet to be read out is read out. In the flowchart of FIG. 4, every time the process of step S401 is executed, one corresponding barycentric position is read out in, for example, ascending order of label number.

In step S402, the distance between the barycentric position of the Superpixel of interest and the barycentric position read out in step S401 is obtained. Here, the Euclidean distance between the barycentric positions is obtained. However, for example, the ratio of the overlap area of two Superpixels to the area of one of the Superpixels may be obtained.

In step S403, stability included in the same background model as the barycentric position read out in step S401 is read out from the background model storage unit 204. For example, when the barycentric position of a Superpixel having a label number=1 is read out in step S401, the stability of the Superpixel having the label number=1 is read out in step S403.

In step S404, a threshold according to the stability read out in step S403 is obtained. Note that a method of obtaining a threshold according to stability and the significance of obtaining a threshold according to stability will be described later.

In step S405, the distance obtained in step S402 and the threshold obtained in step S404 are compared. If the distance obtained in step S402 is smaller than the threshold obtained in step S404 as the result of comparison, the process advances to step S406. If the distance obtained in step S402 is larger than the threshold obtained in step S404, the process advances to step S407.

In step S406, the label number included in the same background model as the barycentric position read out in step S401 is registered in the memory (not shown) of the image processing apparatus. For example, when the barycentric position of a Superpixel having a label number=1 is read out in step S401, the label number=1 is registered in the memory in step S406.

Figure 5A:
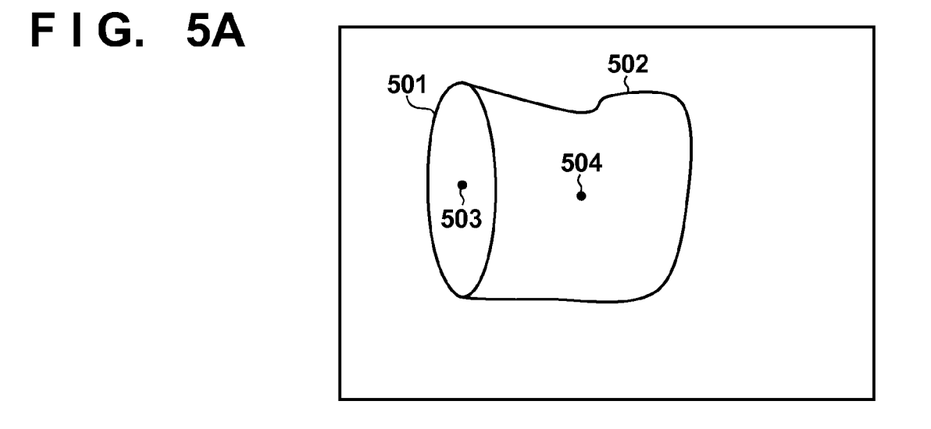
FIGS. 5A to 5C are views for explaining a method of obtaining a threshold according to stability and the significance of obtaining a threshold according to stability.

A method of obtaining a threshold according to stability and the significance of obtaining a threshold according to stability will be described here with reference to FIGS. 5A to 5C. If the threshold is fixed independently of stability, the following problem arises. Assume that a Superpixel 501 having a barycentric position 503 and a Superpixel 502 having a barycentric position 504 are located as shown in FIG. 5A. The Superpixel 501 has a very short width in the horizontal direction. Assume that a frame image captured at an image capturing position and orientation shifted from the state shown in FIG. 5A is a frame image shown in FIG. 5B. At this time, the Superpixel 501 changes to a Superpixel 505, and a barycentric position 507 is slightly shifted from the barycentric position 503. In addition, the Superpixel 502 changes to a Superpixel 506, and a barycentric position 508 is slightly shifted from the barycentric position 504.

Figure 5B:
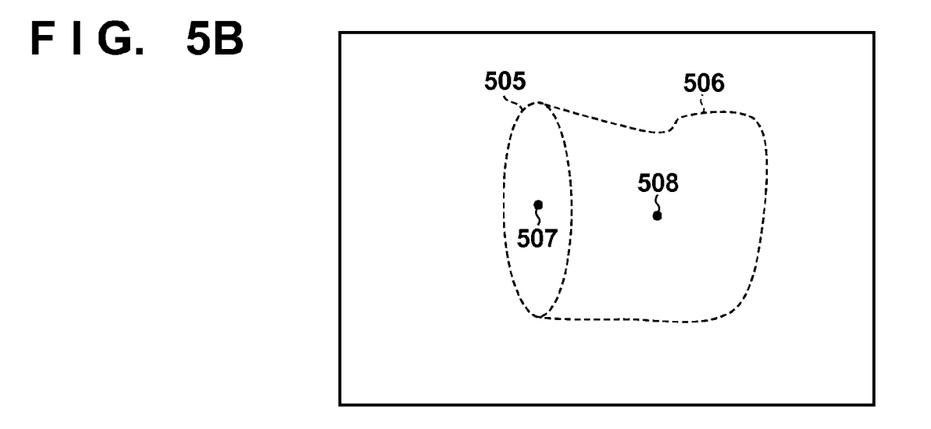
Figure 5C:
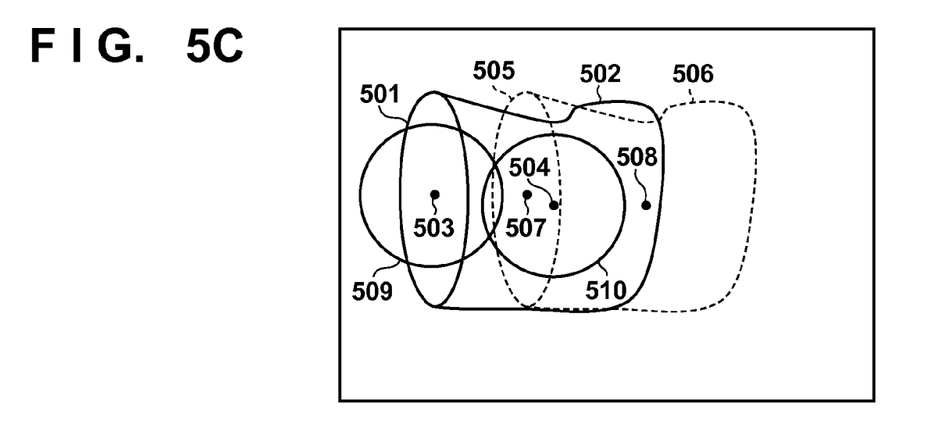

FIG. 5C shows a state in which FIGS. 5A and 5B overlap. If the threshold is fixed, a circle 509 having the barycentric position 503 as the center and the threshold as the radius and a circle 510 having the barycentric position 504 as the center and the threshold as the radius can be set. When the Superpixel 505 is selected as a Superpixel of interest, the barycentric position 507 is located in the circle 510, that is, located within the distance of the threshold from the barycentric position 504. At this time, in step S406, the label number of the Superpixel 502 is registered in the memory as the label number of a Superpixel close to the Superpixel 505. However, it is originally right to register the label number of the Superpixel 501 in the memory. As described above, it may be impossible to select a correct Superpixel for a Superpixel having a width smaller than the threshold.

To cope with this, the threshold is made large, and a Superpixel corresponding to the Superpixel of interest is selected from a wider range. However, if the Superpixel is unstable, a Superpixel that does not correspond to the background model may unexpectedly have a similar shape, resulting in a detection error. Hence, using the stability (standard deviation) $\sigma_{s,t}$ of the shape feature, a threshold T1 is decided by $$T1 = S + \alpha \cdot \frac{1}{\sigma_{s,t}^2} \quad (3)$$

where S is the average interval of barycentric positions, and $\alpha$ is a predetermined threshold. Letting N be the total number of pixels of an image, and K be the number of Superpixels divided from one image, S can be obtained by $S=\sqrt{(N/K)}$. The more stable the shape of a Superpixel is, the more stable an extracted feature amount is. For this reason, even when the Superpixel is selected, the feature comparison unit 206 and the object region output unit 207 can do correct determination. Hence, the higher the stability is, the wider the range where the selection can be done is. The more stable the shape is in equation (3), the smaller $\sigma_{s,t}$ is. For this reason, the threshold becomes large, and a wider range can be handled as the neighborhood. However, the method of obtaining the threshold from stability is not limited to the above method as long as the threshold having such a characteristic can be obtained.

Referring back to FIG. 4, in step S407, it is determined whether all background models of Superpixels stored in the background model storage unit 204 have undergone the processes of steps S401 to S406. Upon determining that all background models of Superpixels stored in the background model storage unit 204 have undergone the processes of steps S401 to S406, the process advances to step S305. On the other hand, if a background model that has not yet undergone the processes of steps S401 to S406 remains in all background models of Superpixels stored in the background model storage unit 204, the process returns to step S401.

When the processing according to the flowchart of FIG. 4 is executed, out of the background models of Superpixels stored in the background model storage unit 204, the label number in the background model of a Superpixel located in the neighborhood of the Superpixel of interest can be registered in the memory.

Referring back to FIG. 3, next, in step S305, the feature comparison unit 206 compares the feature vector acquired from each Superpixel of the frame image with the average vector included in the same background model as the label number registered in the memory concerning the Superpixel.

More specifically, if
for color features (i=1 to 3), $$|F_{t,i} - \mu_{t,i}| < k \cdot \sigma_{c,t} \quad (4)$$

and
for a shape feature (i=4), $$|F_{t,i} - \mu_{t,i}| < l \cdot \sigma_{s,t} \quad (5)$$

are satisfied simultaneously for the Superpixel of interest in the frame image, the Superpixel of interest is determined to be the background. In inequalities (4) and (5), $F_t$ is the feature vector of the Superpixel of interest of the frame image, and $\mu_t$ is the average vector included in the same background model as the label number registered in the memory concerning the Superpixel of interest. In addition, i represents the ith dimension of the n-dimensional vector, and k and l are predetermined constants.

As described above, the more unstable a Superpixel is (the larger $\sigma_{c,t}$ and $\sigma_{s,t}$ are), the more easily the difference between features is generated. Hence, the threshold is obtained such that a large difference is permitted in accordance with $\sigma_{c,t}$ and $\sigma_{s,t}$, as indicated by inequalities (4) and (5). This can prevent a detection error caused by an unstable Superpixel.

In this embodiment, both the color features and the shape feature are used as features. If only the color features are used, and a Superpixel having a color similar to that of an object to be detected exists on the background, a detection error occurs. For example, if a person in a red shirt passes in front of a red vase, Superpixels having similar colors are determined as the background although the shapes are obviously different. The shape of each Superpixel reflects the shape of the object. Hence, a detection error is prevented by using the shape feature. Note that if a plurality of label numbers are registered in the memory concerning the Superpixel of interest, a label number included in the same background model as a barycentric position having the minimum distance from the barycentric position of the Superpixel of interest is employed out of the plurality of label numbers.

When such processing is performed for each Superpixel in the frame image, it can be determined whether the Superpixel is the background.

In step S306, the object region output unit 207 generates and outputs information representing a Superpixel that has not been determined as the background, that is, a Superpixel that has been determined to include an object out of the Superpixels in the frame image. For example, for each pixel of the frame image, if the pixel belongs to a Superpixel that has been determined as the background, a value "0" is assigned. If the pixel belongs to a Superpixel that has not been determined as the background, a value "1" is assigned. An image formed from the values assigned to the pixels of the frame image is output as a mask image. In this mask image, a region formed from pixels to which the value "1" is assigned is a Superpixel that has not been determined as the background, that is, a Superpixel that has been determined as a region including an object.

In step S307, the feature updating unit 208 updates, out of the average vectors $\mu_t$ of the Superpixels registered in the background model storage unit 204, the average vector $\mu_t$ used for comparison with the feature vector of the Superpixel in the frame image determined to be the background. This updating is done in accordance with $$\mu_t = (1-\rho)\mu_{t-1} + \rho F_t \quad (6)$$

The value of the calculation result $\eta$ of equation (1) is used as $\rho$. For example, assume that concerning a Superpixel A determined to be the background of the frame image, the label numbers of Superpixels P and Q are registered in the memory in step S304, and the barycentric position of the Superpixel Q is closer to the barycentric position of the Superpixel A than the barycentric position of the Superpixel P. In this case, the average vector of the Superpixel Q is updated using the feature vector of the Superpixel A. Note that as the initial value of $\mu_t$, a feature vector acquired from a frame image input for the first time is directly used as $\mu_t$.

In step S308, the stability calculation unit 209 calculates a value representing whether an image feature is stable with respect to the time base as stability on a Superpixel basis. The stability is calculated as the standard deviation $\sigma$ expressed as a Gaussian model, as described above. The stability is given an appropriate initial value at the time of activation and updated for each frame in accordance with for color features (i=1 to 3), $$\sigma_{c,t}^2 = (1-\rho)\sigma_{c,t-1}^2 + \rho(F_t-\mu_t)^T(F_t-\mu_t) \quad (7)$$

and for a shape feature (i=4), $$\sigma_{s,t}^2 = (1-\rho)\sigma_{s,t-1}^2 + \rho(F_t-\mu_t)^T(F_t-\mu_t) \quad (8)$$

Note that the result of updating by equation (6) is used as $\mu_t$. The difference $(F_t-\mu_t)$ between the feature vector $F_t$ and the average vector $\mu_t$ in the tth frame is an amount representing the degree of stability of the feature vector. That is, if small differences continue, the feature vector is regarded as stable. This is reflected on $\sigma_{t-1}$ calculated from the feature vectors up to the (t−1)th frame, thereby obtaining $\sigma_{c,t}$ and $\sigma_{s,t}$ representing the stability of the feature vector in the time direction. The calculation result of equation (1) is used as $\rho$. Note that the initial values of $\sigma_{c,t}$ and $\sigma_{s,t}$ are set to $\sigma_{c,t}=0$ and $\sigma_{s,t}=0$.

As described above, in this embodiment, an image acquired by video input is divided into a plurality of subregions each including pixels of similar attributes (region division). A feature is extracted from each divided subregion based on the attribute (feature extraction). On the other hand, background models formed from the extracted features are stored in advance (background model storage). The features extracted by feature extraction are compared with features in the background models, thereby determining for each subregion whether the subregion is the background (feature comparison).

With this arrangement, the problems caused by the motion of a camera in the conventional techniques can be solved. An image is divided to suppress the memory consumption and the processing cost. The division is done such that not the shape or size but an attribute such as the color of included pixels is even in the divided regions (Superpixel division). Since feature amounts based on the same attribute are extracted, the features near the object boundary do not change even if a screen shift occurs, and a detection error can be avoided.

In addition, the shape feature at the Superpixel boundary is used, thereby preventing a detection error even when the color features in a Superpixel are similar between the background model and the input image. The problem caused by instability of a Superpixel can also be solved by introducing the stability of Superpixels and changing the threshold upon feature amount comparison or changing the range of neighboring region selection in accordance with the stability.

Second Embodiment

The functional units shown in FIG. 2 may be stored in one image processing apparatus. However, one or more functional units may be included in an external device. In this case, the image processing apparatus needs to be connected to the external device via a network so as to be data-communicable. The functional units shown in FIG. 2 may be put together on one chip, as a matter of course.

Figure 1:
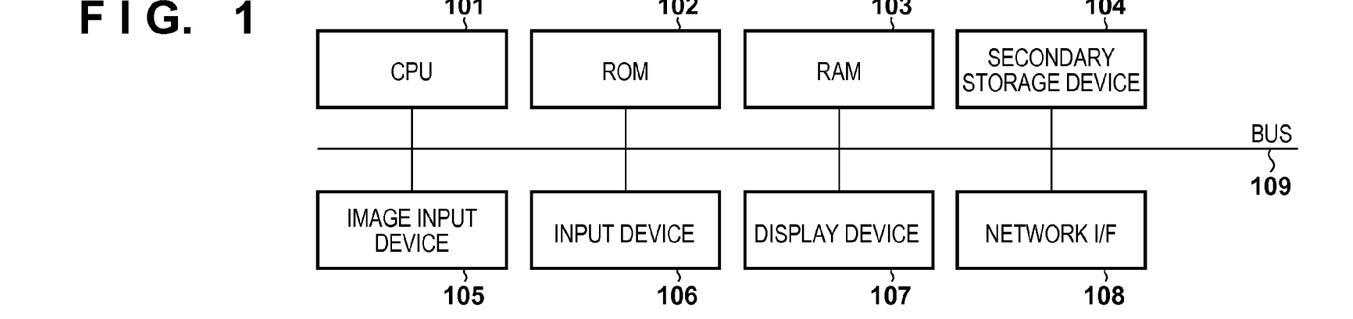
FIG. 1 is a block diagram showing an example of the hardware arrangement of a computer.

In addition, the arrangement shown in FIG. 2 can function as an image processing apparatus having the arrangement shown in FIG. 2 if it is a computer including a memory that also functions as a background model storage unit 204, and a processor capable of executing computer programs configured to cause the processor to execute the functions of functional units other than the background model storage unit 204 in FIG. 2. An example of the hardware arrangement of such a computer will be described with reference to the block diagram of FIG. 1. Note that the arrangement shown in FIG. 1 is merely an example of a computer applicable to the image processing apparatus described in the first embodiment, and any other arrangement that implements functions equal to or more than those of the image processing apparatus described in the first embodiment may be employed.

A CPU 101 executes various kinds of processing using computer programs and data stored in a ROM 102 or a RAM 103, thereby controlling the operation of the computer. The CPU 101 also executes each processing explained as processing to be executed by the image processing apparatus described in the first embodiment.

The ROM 102 stores the setting data, the boot program, and the like of the computer. The RAM 103 includes an area to store computer programs and data loaded from a secondary storage device 104, the image of each frame input from an image input device 105, and data externally received via a network I/F (interface) 108. The RAM 103 also includes a work area used by the CPU 101 to execute various kinds of processing. That is, the RAM 103 can appropriately provide various kinds of areas.

The secondary storage device 104 is a mass information storage device represented by a hard disk drive. The secondary storage device 104 stores an OS (Operating System), and computer programs and data configured to cause the CPU 101 to implement the functions of functional units other than the background model storage unit 204 in FIG. 2. The data also include those handled as known information in the above description. The computer programs and data stored in the secondary storage device 104 are appropriately loaded to the RAM 103 under the control of the CPU 101 and processed by the CPU 101. Note that units such as the background model storage unit 204 described as a memory in the first embodiment can be constituted by the RAM 103 or the secondary storage device 104.

An image input device 105 is a device configured to input the image of each frame of a moving image to the computer, for example, a video camera.

An input device 106 is formed from a keyboard or a mouse, and can input various instructions to the CPU 101 when operated by the user of the computer.

A display device 107 is formed from a CRT or a liquid crystal screen, and can display the processing result of the CPU 101 as images or characters. For example, the image of each frame input by the image input device 105 to the computer or the result of object detection in the image can be displayed.

The network I/F 108 is used to connect the computer to a network such as a LAN or the Internet. The computer can communicate data with an external device via the network I/F 108. The image of each frame explained as an image input by the image input device 105 to the computer may be transmitted from an external device by a technique such as streaming, as a matter of course. In this case, the image of each frame is input to the computer via the network I/F 108. All the above-described units are connected to a bus 109.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075716, filed Apr. 1, 2014, which is hereby incorporated by reference herein in its entirety.

What is claimed is:

1. An image processing apparatus comprising a processor and a memory storing a background model generated from a background image, the background model including a feature of each region in the background image and stability in terms of time for the feature extracted from that region, and storing instructions which, when executed by the processor, cause the image processing apparatus to:
    input a video;
    divide an input image in the video into a plurality of regions based on superpixels;
    extract a feature from each of the plurality of regions;
    select with respect to a region of interest in the input image, based on the stability of the feature of each region in the background model, a neighboring region in the background model in a neighborhood of the region of interest;
    compare the feature extracted from the region of interest in the input image with a feature of the selected neighboring region in the background model; and
    determine for each of the plurality of regions in the input image whether the region is the background based on a result of the comparison.

2. The apparatus according to claim 1, wherein the superpixels include pixels having at least one of a color and a luminance.

3. The apparatus according to claim 1, wherein the extracted feature includes a shape feature of the region.

4. The apparatus according to claim 3, wherein the shape feature includes at least one of a pixel position of a pixel on a boundary of the region, a pixel position of each pixel in the region, the number of pixels in the region, and an area of the region.

5. The apparatus according to claim 1, wherein the background model includes a time statistic of the feature extracted from the region of the background.

6. The apparatus according to claim 1, wherein the instructions further cause the image processing apparatus to calculate the stability of each region in the background image.

7. The apparatus according to claim 1, wherein the instructions further cause the image processing apparatus to output an object region based on a result of determination for each of the plurality of regions in the input image.

8. The apparatus according to claim 1, wherein the instructions further cause the image processing apparatus to select, with respect to a region of interest in the input image, the neighboring region in the background model based on the stability of the feature of each region in the background model and a distance between the region of interest and the region in the background model.

9. The apparatus according to claim 8, wherein the instructions further cause the image processing apparatus to set a threshold for the distance based on the stability and selects the neighboring region in the background model if the distance is not longer than the threshold.

10. The apparatus according to claim 1, wherein the stability of the feature represents stability in terms of time for the feature.

11. An image processing method performed by an image processing apparatus, the image processing method comprising:
    inputting a video;
    dividing an input image in the video into a plurality of regions based on superpixels;
    extracting a feature from each of the plurality of regions;
    storing a background model generated from a background image, the background model including a feature of each region in the background image and stability in terms of time for the feature extracted from that region;
    selecting with respect to a region of interest in the input image, based on the stability of the feature of each region in the background model, a neighboring region in the background model in a neighborhood of region of interest;
    comparing the feature extracted from the region of interest in the input image with a feature of the selected neighborhood region in the background model; and
    determining for each of the plurality of regions in the input image whether the region is the background based on a result of the comparison.

12. A non-transitory computer-readable storage medium storing a background model generated from a background image, the background model including a feature of each region in the background image and stability in terms of time for the feature extracted from that region, and storing a computer program for causing a computer to:
    input a video;
    divide an input image in the video into a plurality of regions based on superpixels;
    extract a feature from each of the plurality of regions;
    select with respect to a region of interest in the input image, based on the stability of the feature of each region in the background model, a neighboring region in the background model in a neighborhood of the region of interest in the input image;

compare the feature extracted from the region of interest in the input image with a feature of the selected neighboring region in the background model; and determine for each of the plurality of regions in the input image whether the region is the background based on a result of the comparison.

13. An image processing apparatus comprising a processor and a memory storing instructions which, when executed by the processor, cause the image processing apparatus to:

input a video;

divide an image in the video into a plurality of regions based on superpixels;

extract a feature from each of the plurality of regions;

store a background model generated from a feature of a background in advance;

compare the extracted feature with a feature in the background model; and determine for each of the plurality of regions whether the region is the background, wherein the extracted feature includes a shape feature of the region, and wherein the shape feature is a ratio of a length of a region boundary having an edge intensity not less than a predetermined value to a peripheral length of a boundary of the region.

14. An image processing method performed by an image processing apparatus, comprising:

dividing an acquired image into a plurality of regions based on superpixels;

extracting a feature from each of the plurality of regions;

storing a background model generated from a feature of a background in advance;

comparing the extracted feature with a feature in the background model; and determining for each of the plurality of regions whether the region is the background, wherein the extracted feature includes a shape feature of the region, and wherein the shape feature is a ratio of a length of a region boundary having an edge intensity not less than a predetermined value to a peripheral length of a boundary of the region.

15. A non-transitory computer-readable storage medium storing a computer program for causing a computer to:

divide an acquired image into a plurality of regions based on superpixels;

extract a feature from each of the plurality of regions;

store a background model generated from a feature of a background in advance;

compare the extracted feature with a feature in the background model; and determine for each of the plurality of regions whether the region is the background, wherein the extracted feature includes a shape feature of the region, and wherein the shape feature is a ratio of a length of a region boundary having an edge intensity not less than a predetermined value to a peripheral length of a boundary of the region.

* * * * *